United States Patent [19]
Brown et al.

[11] Patent Number: 5,658,404
[45] Date of Patent: *Aug. 19, 1997

[54] RADIAL PNEUMATIC LIGHT TRUCK OR AUTOMOBILE TIRE

[75] Inventors: Stephanie Carol Brown, Akron; Donald Woodrow Gilliam, Uniontown; Andy Ngoc Hoang, Akron; Michael Alois Kolowski, Mogadore; Frederick William Miller, Akron; Anthony John Scarpitti, Uniontown; Keith Carl Trares, Akron, all of Ohio

[73] Assignee: The Goodyear Tire & Rubber Company, Akron, Ohio

[*] Notice: The term of this patent shall not extend beyond the expiration date of Pat. No. Des. 365,791.

[21] Appl. No.: 228,056

[22] Filed: Apr. 15, 1994

[51] Int. Cl.$^6$ ................................................ B60C 11/00
[52] U.S. Cl. ........................................................ 152/209 A
[58] Field of Search ............................ 152/209 R, 209 A, 152/209 D

[56] References Cited

U.S. PATENT DOCUMENTS

| | | | |
|---|---|---|---|
| D. 187,175 | 2/1960 | Smajd et al. | D90/20 |
| D. 324,840 | 3/1992 | Maxwell et al. | D12/147 |
| D. 325,012 | 3/1992 | Covert et al. | D12/147 |
| D. 325,014 | 3/1992 | Galante et al. | D12/147 |
| D. 329,032 | 9/1992 | Maxwell et al. | D12/147 |
| D. 329,627 | 9/1992 | Attinello et al. | D12/151 |
| D. 336,273 | 6/1993 | Kohara et al. | D12/147 |
| D. 347,412 | 5/1994 | Croyle . | |
| D. 347,816 | 6/1994 | Maxwell et al. | D12/147 |
| D. 365,791 | 1/1996 | Brown et al. | D12/146 |

(List continued on next page.)

FOREIGN PATENT DOCUMENTS

| | | | |
|---|---|---|---|
| 0428472 | 11/1990 | European Pat. Off. | B60C 11/03 |
| 0503404 | 2/1992 | European Pat. Off. | B60C 11/04 |
| 0508090 | 2/1992 | European Pat. Off. | B60C 11/04 |
| 0503534 | 3/1992 | European Pat. Off. | B60C 11/06 |
| 0819836 | 6/1936 | France . | |
| 2338814 | 1/1977 | France | B60C 11/04 |
| 2029844 | 6/1970 | Germany | B60C 11/06 |
| 2912608 | 10/1979 | Germany | 152/209 D |
| 258779 | 8/1988 | Germany | 152/209 D |
| 193704 | 10/1985 | Japan | 152/209 R |
| 1166708 | 7/1986 | Japan . | |
| 190504 | 7/1989 | Japan | 152/209 WT |
| 139402 | 6/1991 | Japan | 152/209 R |
| 139404 | 6/1991 | Japan | 152/209 R |
| 246104 | 11/1991 | Japan | 152/209 R |
| D. 33128 | 2/1973 | Luxembourg . | |
| 0357419 | 9/1931 | United Kingdom . | |
| 2221877 | 2/1990 | United Kingdom . | |

OTHER PUBLICATIONS

Tire Business, p. 38, Sep. 6, 1993.

*Primary Examiner*—Steven D. Maki
*Attorney, Agent, or Firm*—David L. King

[57] ABSTRACT

A radial pneumatic light truck or automobile tire 40 having a tread 42 is described. The tread 42 has a base 43, a plurality of traction elements 52 extending radially outwardly from the base 43 and at least one circumferentially continuous wide groove 54,55. The wide groove 54,55 has a circumferentially continuous window 72 extending from the tread base 43 to the radially outer contacting surface 53. The window 72, when viewed in the ground contacting portion of the tread 42, has a shape that is triangular or trapezoidal having two sides 73,74 and a radially outer long base 75. The long base 75 has an axial width of 7% to 20% of the tread width. The wide groove 54,55 has a zig-zag portion 70 extending radially from the tread base 43 in a circumferentially continuous path. The sides 73,74 of the window 72 define the maximum axial extent or amplitude of the zig-zag portion 70 into the wide groove 54,55. Preferably the tread 42 is asymmetrical and non-directional and has two wide grooves 54,55 dividing the plurality of traction elements into three zones 60,61,62, each zone having a different net-to-gross ratio.

25 Claims, 7 Drawing Sheets

U.S. PATENT DOCUMENTS

| | | | |
|---|---|---|---|
| 3,055,410 | 9/1962 | Caulkins | 152/209 |
| 3,682,220 | 8/1972 | Verdier | 152/209 D |
| 4,114,671 | 9/1978 | Maiocchi et al. | 152/209 R |
| 4,200,134 | 4/1980 | Takigawa et al. | 152/209 |
| 4,271,885 | 6/1981 | Takigawa et al. | 152/209 |
| 4,284,115 | 8/1981 | Ohnishi | 152/209 R |
| 4,345,632 | 8/1982 | Takigawa et al. | 152/209 R |
| 4,635,694 | 1/1987 | Hosokawa | 152/209 A |
| 4,823,855 | 4/1989 | Goergen et al. | 152/209 R |
| 4,854,358 | 8/1989 | Takeuchi | 152/209 |
| 4,936,363 | 6/1990 | Schuster et al. | 152/209 |
| 5,099,899 | 3/1992 | Takeuchi | 152/209 R |
| 5,154,216 | 10/1992 | Ochiai et al. | 152/209 R |
| 5,222,537 | 6/1993 | Saito et al. | 152/209 R |
| 5,327,952 | 7/1994 | Glover et al. | 152/209 R |
| 5,329,980 | 7/1994 | Swift et al. | 152/209 A |
| 5,361,814 | 11/1994 | Covert et al. | 152/209 A |

RADIAL PNEUMATIC LIGHT TRUCK OR AUTOMOBILE TIRE

BACKGROUND OF THE INVENTION

This invention relates to a tread for a pneumatic tire; more specifically, to a tread for light truck or automobile type vehicles.

A recent tread design was disclosed relating to a tread having an aquachannel. U.S. Pat. No. 5,176,766 issued Jan. 5, 1993, describes a directional tire having an annular aquachannel. The tire is commercially sold under the name Aquatred®.

The above-referenced tire has demonstrated significant improvements in wet traction and hydroplaning characteristics.

Figure 1:
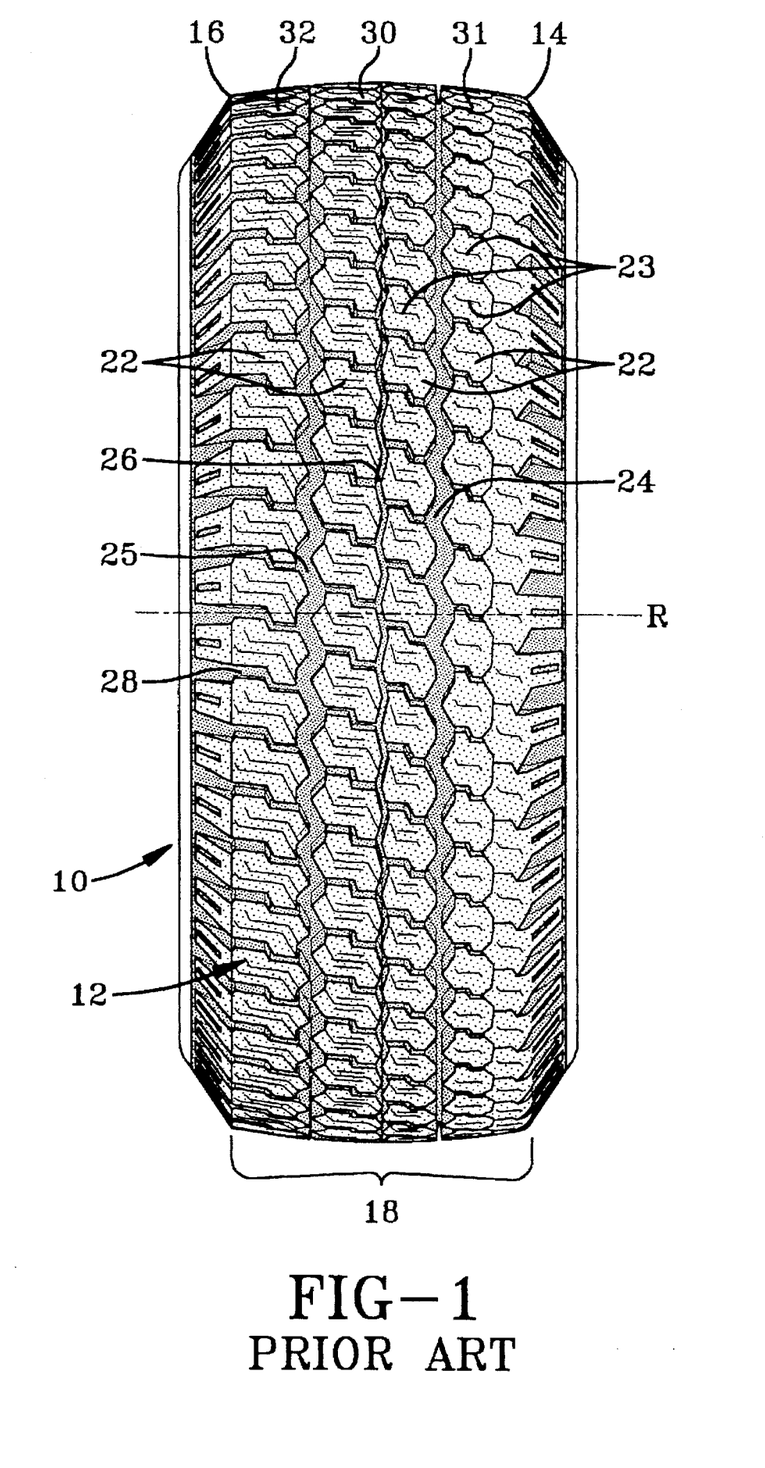
FIG. 1 is a plan view of a prior art tread annularly attached to a tire.
Figure 2:
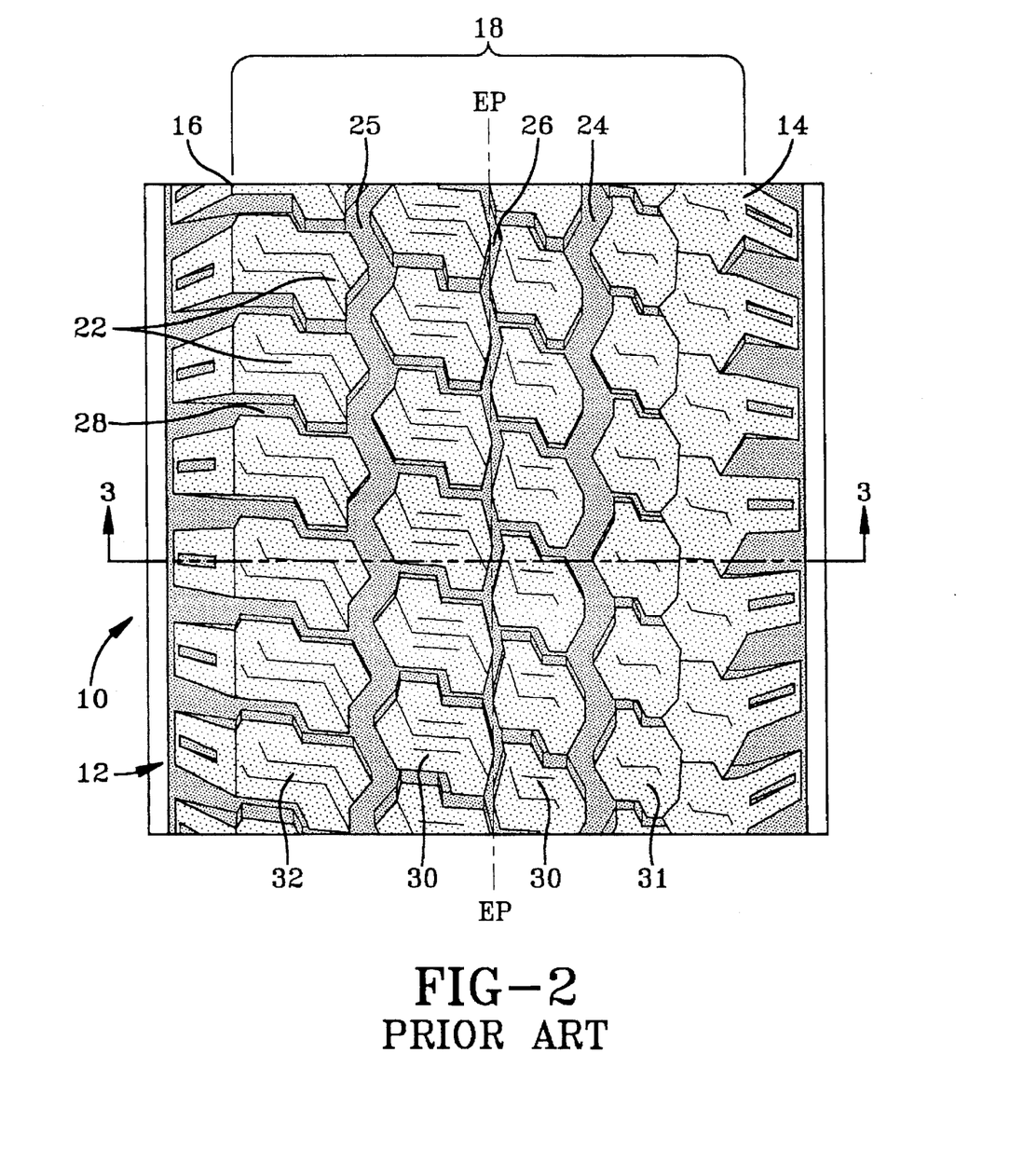
FIG. 2 is a partial enlarged front view of the prior art tread illustrated in FIG. 1.
Figure 3:
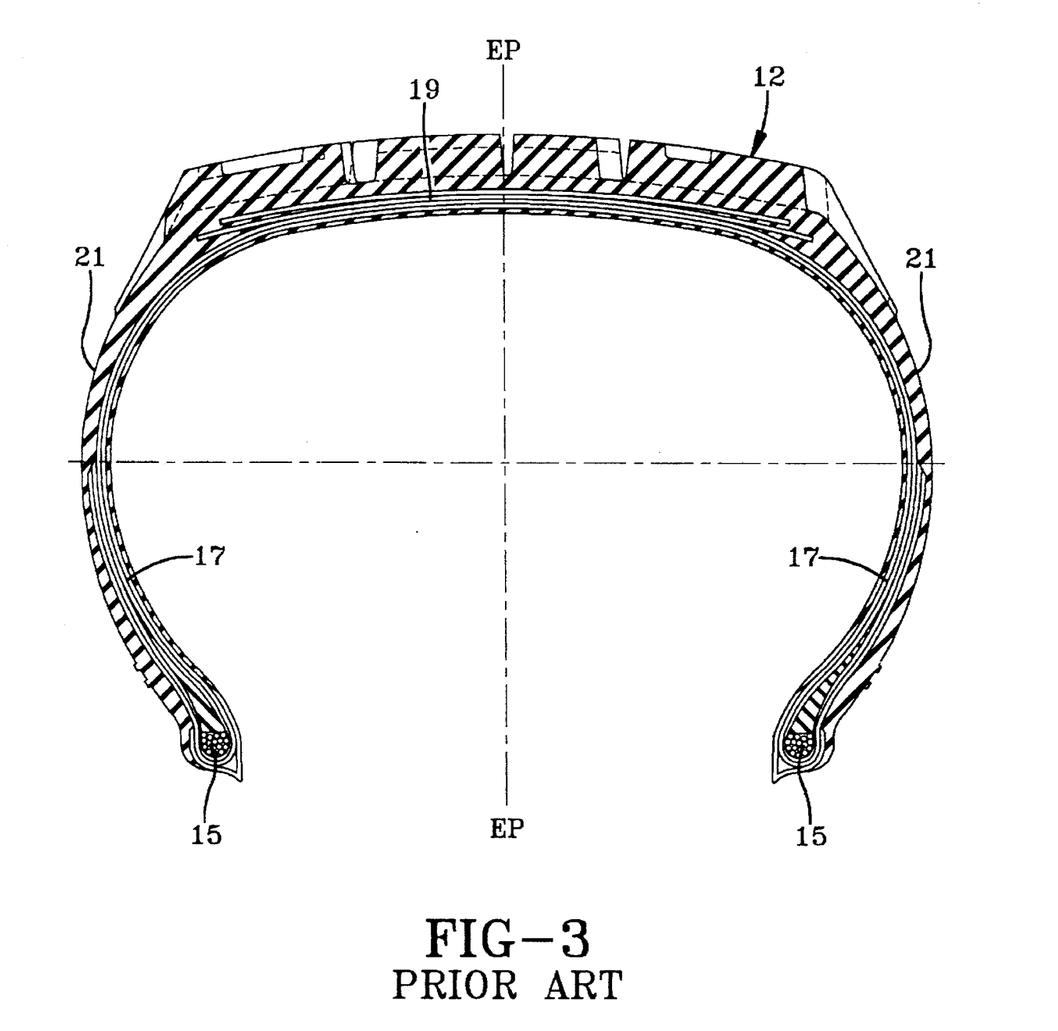
FIG. 3 is a cross-sectional view of the prior art tire of FIG. 2 taken along a plane passing through the tire's axis of rotation.

Interestingly, in applications where vehicles have lightly loaded rear tires and more heavily loaded front tires, such as light trucks or vans, it has been established that the rear tires have a footprint that is loaded primarily in the central portion of the tread and the front tires have a tendency to wear rapidly on the outer side of the tire relative to the vehicle. This unique wear pattern resulted in the development of the Goodyear Wrangler GSA® tread pattern as shown in FIGS. 1–3.

The Wrangler GSA® tire has an asymmetric nondirectional tread. The tread has three distinct tread zones, each zone provides unique wear and traction characteristics most suitably designed for light truck type vehicles.

This prior art tire exhibits two wide circumferentially extending zig-zag grooves which divide the tread into three tread zones. The outboard shoulder zone has a high net-to-gross ratio, the central zone has a slightly lower net-to-gross ratio than the outboard zone, and the inboard shoulder zone has the most open or lowest net-to-gross ratio. The tire exhibits excellent wear characteristics while also providing superb traction, both on and off the road.

Attempts to employ the Aquatred® aquachannel type groove in a light truck tire such as the Wrangler® GSA have created significant design tradeoffs or compromises. In particular, the employment of a wide circumferentially straight aquachannel, if positioned in the center of the tread, can induce rapid wear on the lightly loaded rear tires of vans or pickup trucks. Secondarily, the Aquatred®-type groove can also diminish the off-road or snow traction performance of the tread.

The present invention is directed to a tread particularly suitable for light truck or automobile use and having at least one, preferably two, aquachannel-type wide grooves; features of the novel tread design, when used in combination, can improve the overall wet traction of the tire without significantly diminishing the wear rate or the off-road and snow traction capability of the tire.

SUMMARY OF THE INVENTION

A radial pneumatic light truck or automobile tire 40 is disclosed. The tread 42, when annularly attached to the tire 40, has an axis of rotation R, a pair of lateral edges 44,46, a tread width TW as defined as the axial distance between lateral edges 44,46, and an equatorial plane EP perpendicular to the axis of rotation R and spaced equidistant from the lateral edges 44,46.

The tread 42 has a tread base 43, a plurality of traction elements 52 extending radially outwardly from the tread base 43 to a radially outer surface 53, and at least one, preferably two, circumferentially continuous wide grooves 54,55. The wide groove or grooves 54,55 each have a circumferentially continuous window 72 extending from the tread base 43 to the radially outer road contacting surface 53. The tread 42, when attached to a normally inflated and loaded tire 40, and when viewed in a plan or frontal view, displays the window 72 in the ground contacting portion of the tread 42 as having a shape that is triangular or trapezoidal. The window 72 has two sides 73,74 and a radially outer long base 75. The long base 75 has an axial width of 7% to 20% of the tread width TW.

Figure 5:
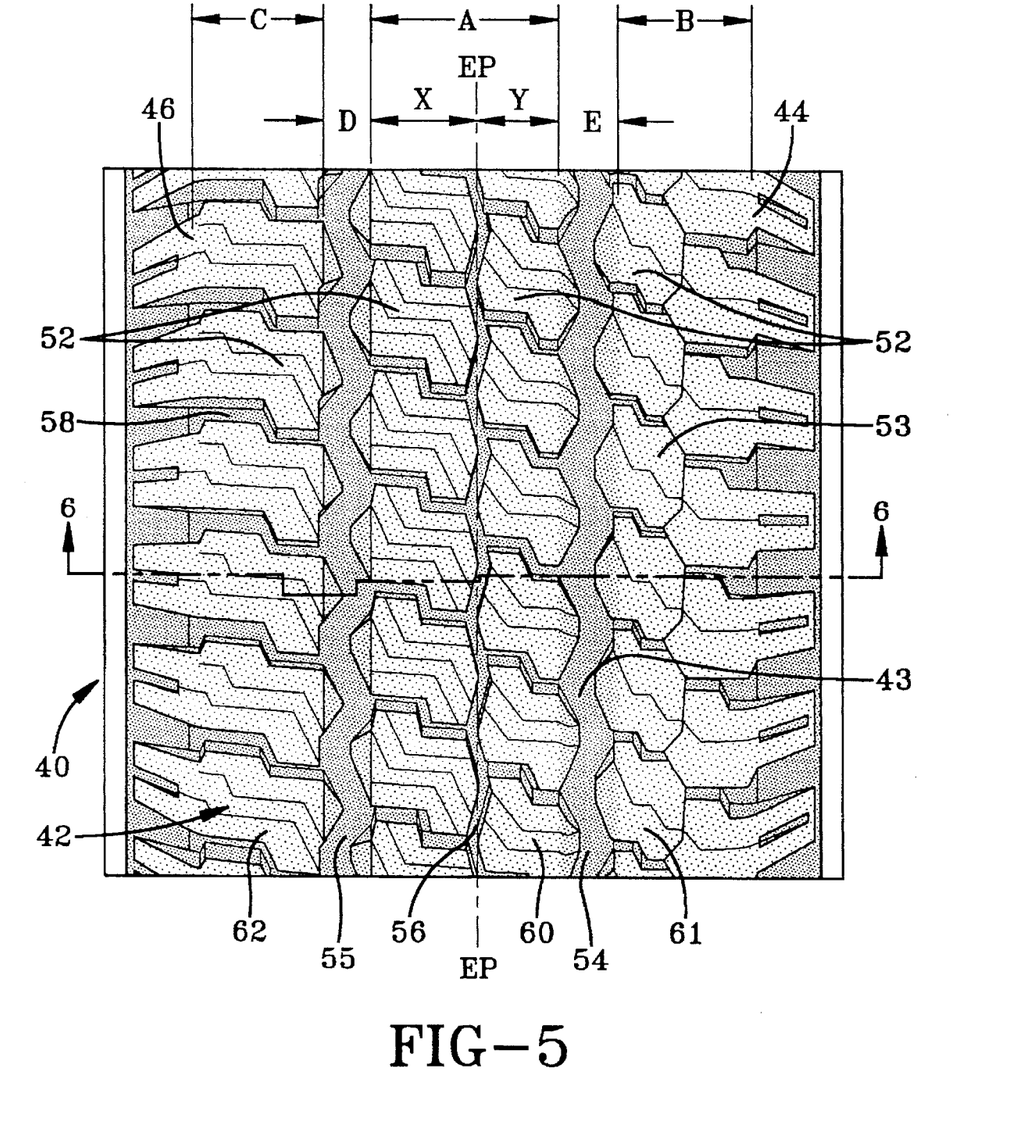
FIG. 5 is a partial enlarged view of the tread illustrated in FIG. 4.
Figure 8:
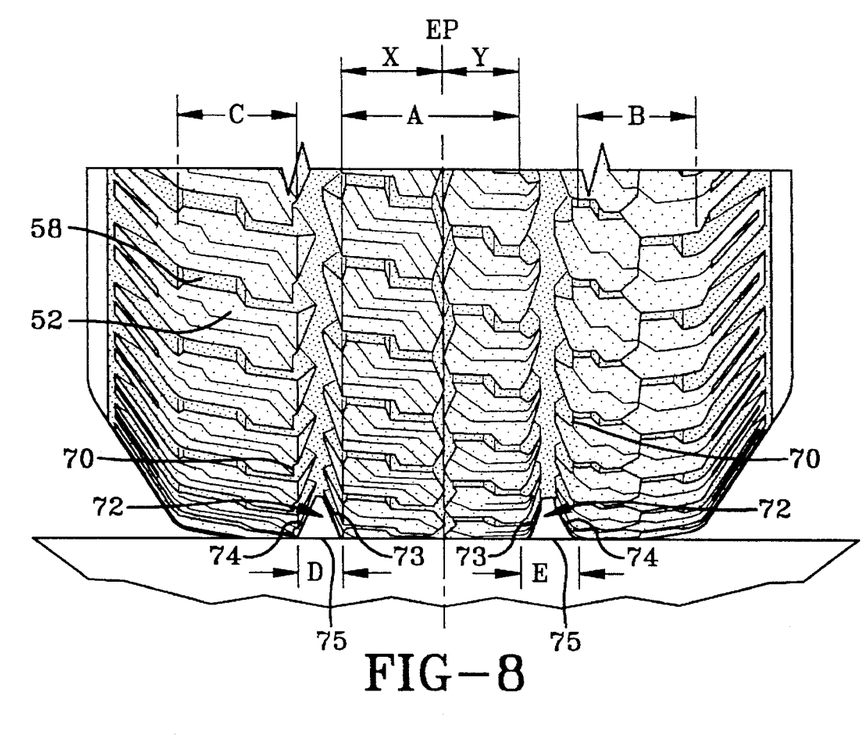
FIG. 8 is a partial plan view of the tread of the present invention as it normally contacts the road surface.

As shown in FIGS. 5 and 8 each traction element adjacent the one wide groove has a straight edge and a portion of the traction element protruding into the one wide groove from the straight edge. The straight edge on one side of the one wide groove are aligned along a first line which extends in the circumferential direction. The straight edges on the other side of the one wide groove are aligned along a second line, which extends in the circumferential direction, the axial distance between the first line and second line defines the width of the long base of the window.

In one embodiment of the invention, the wide groove 54,55 has a zig-zag portion 70 extending radially from the tread base 43 in a circumferentially continuous zig-zag path. The amplitude of the zig-zag is limited in the axial direction to create the window 72 of substantially triangular or trapezoidal shape.

In a preferred embodiment of the invention, two wide grooves 54,55 are employed. The first wide groove 54 is axially spaced a distance from the equatorial plane less than the axial distance the second wide groove 55 is spaced, as measured from the intersection of the long base 75 and the nearest side 73 of each window 72 relative to the equatorial plane EP.

In a further preferred embodiment of the invention, two wide grooves 54,55 divide the plurality of traction elements 52 into three distinct zones. A first zone 60 is located between the two wide grooves. A second zone 61 is located between a first lateral edge 44 and a first wide groove 54 and the third 62 is located between a second lateral edge 46 and a second wide groove 55. The first zone 60 has a net-to-gross ratio as measured around the entire circumference of the tread greater than 90% of the net-to-gross ratio of the third zone 62 and less than the net-to-gross ratio of the second zone 61. The second zone 61 has a net-to-gross ratio at least 110% of the third zone. The traction elements 52 preferably are block elements spaced circumferentially by lateral grooves 58, the lateral grooves 58 extending from a lateral edge 46 to the traction elements adjacent the opposite lateral edge 44.

DEFINITIONS

"Aspect ratio" of the tire means the ratio of its section height (SH) to its section width (SW) multiplied by 100% for expression as a percentage.

"Asymmetric tread" means a tread that has a tread pattern not symmetrical about the centerplane or equatorial plane EP of the tire.

"Circumferential" means lines or directions extending along the perimeter of the surface of the annular tread perpendicular to the axial direction.

"Equatorial plane (EP)" means the plane perpendicular to the tire's axis of rotation and passing through the center of its tread.

"Footprint" means the contact patch or area of contact of the tire tread with a flat surface at zero speed and under normal load and pressure.

"Groove" means an elongated void area in a tread that may extend circumferentially or laterally about the tread in a straight, curved, or zigzag manner. Circumferentially and laterally extending grooves sometimes have common portions. The "groove width" is equal to tread surface are occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are of substantially reduced depth as compared to wide circumferential grooves which they interconnect, they are regarded as forming "tie bars" tending to maintain a rib-like character in the tread region involved.

"Inboard side" means the side of the tire nearest the vehicle when the tire is mounted on a wheel and the wheel is mounted on the vehicle.

"Lateral" means an axial direction.

"Net contact area" means the total area of ground contacting elements between defined boundary edges divided by the gross area between the boundary edges as measured around the entire circumference of the tread.

"Net-to-gross ratio" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning. "Axial" and "axially" means lines or directions that are parallel to the axis of rotation of the tire.

"Outboard side" means the side of the tire farthest away from the vehicle when the tire is mounted on a wheel and the wheel is mounted on the vehicle.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction.

"Tread element" or "traction element" means a rib or a block element.

DETAILED DESCRIPTION OF THE INVENTION

With reference to FIGS. 1–3, a tread 12 according to the prior art is illustrated. The tread 12 is annularly attached to a tire 10. The tread 12 as illustrated is asymmetric and non-directional.

Often, a non-directional tread has a tread design element with rotational symmetry about the equatorial plane EP, as opposed to mirror-image symmetry; rotational symmetry is not essential for non-directionality of a tread design, as is illustrated by the preferred tread described herein.

The conventional passenger or light truck tire also may have a tread pattern that is symmetrical relative to the centerplane of the tread. This allows the tire to be mounted on either side of the vehicle regardless of the direction of travel. This symmetry of design does not take in account that design loads and requirements might be different at different tire locations on the vehicle.

The use of a tire with asymmetric tread means that the tread is designed to be mounted such that the inboard side and the outboard side of the tread pattern is maintained regardless of the side of the vehicle on which the tire is mounted. This means each tire tread design can be optimized to accommodate the requirements of the vehicle on either side of the vehicle. The design of the tire tread may vary across the width of the tread so that capabilities of the different regions of the tread width may be varied to enhance tire performance.

The tread 12 illustrated in FIGS. 1–3 is one example of an asymmetric and non-directional tread design according to the prior art.

The tread 12, when configured annularly, has an axis of rotation R, first and second lateral edges 14,16 a central portion 18 therebetween. The first lateral edge 14 is toward the outside or outboard side of the vehicle while the second lateral edge 16 is designed to be mounted inboard or toward the inside of the vehicle.

The tread 12 has a plurality of ground engaging traction elements 22 separated by circumferential grooves 24,25,26 and lateral grooves 28. The lateral grooves 28 may intersect and join to form a continuous lateral groove path across the entire tread width. Alternatively the lateral grooves 28 may be laterally or circumferentially spaced and never connecting, or may meet at a groove.

The tread 12 as illustrated in FIGS. 1–3 has an overall net contact area of 66% measured from tread lateral edge to tread lateral edge. Each traction element 22 has one or more sipes 17, excepting those adjacent the lateral edge 14.

The tread 12 is divided laterally into three tread zones 30,31,32. The first tread zone 30 is located between the two wide zig-zag grooves. The second zone 31 is positioned between the first lateral edge 14 and the first groove 24. The third tread zone 32 extends from the second lateral edge 16 to the second wide groove 25.

The outer or second tread zone 32 is intended to be mounted on the outer or outboard side of the vehicle (not shown). While the third tread zone 31 has a lower net contact area relative to the second tread zone 32, the first tread zone 30 has a net contact area preferably between the value of the second and third zones.

This prior art tire as described above is the commercially available Goodyear Wrangler GSA®. The three distinct tread zones 30,31,32 provide excellent traction, both on and off road and also has demonstrated excellent wear characteristics.

The commercially available Wrangler GSA® tire described above was used as a control tire in evaluating the performance characteristics of the tire according to the present invention. The results of the comparative testing are discussed later.

With reference to FIGS. 4–6 and FIG. 8, a tire 40 having a tread 42 according to a preferred embodiment of the present invention is shown. The tread 42 when configured annularly has an axis of rotation R, first and second lateral edges 44,46. The first lateral edge 44 is toward the outside or outboard side of the vehicle while the second lateral edge 46 is designed to be mounted inboard or toward the inside of the vehicle.

Figure 4:
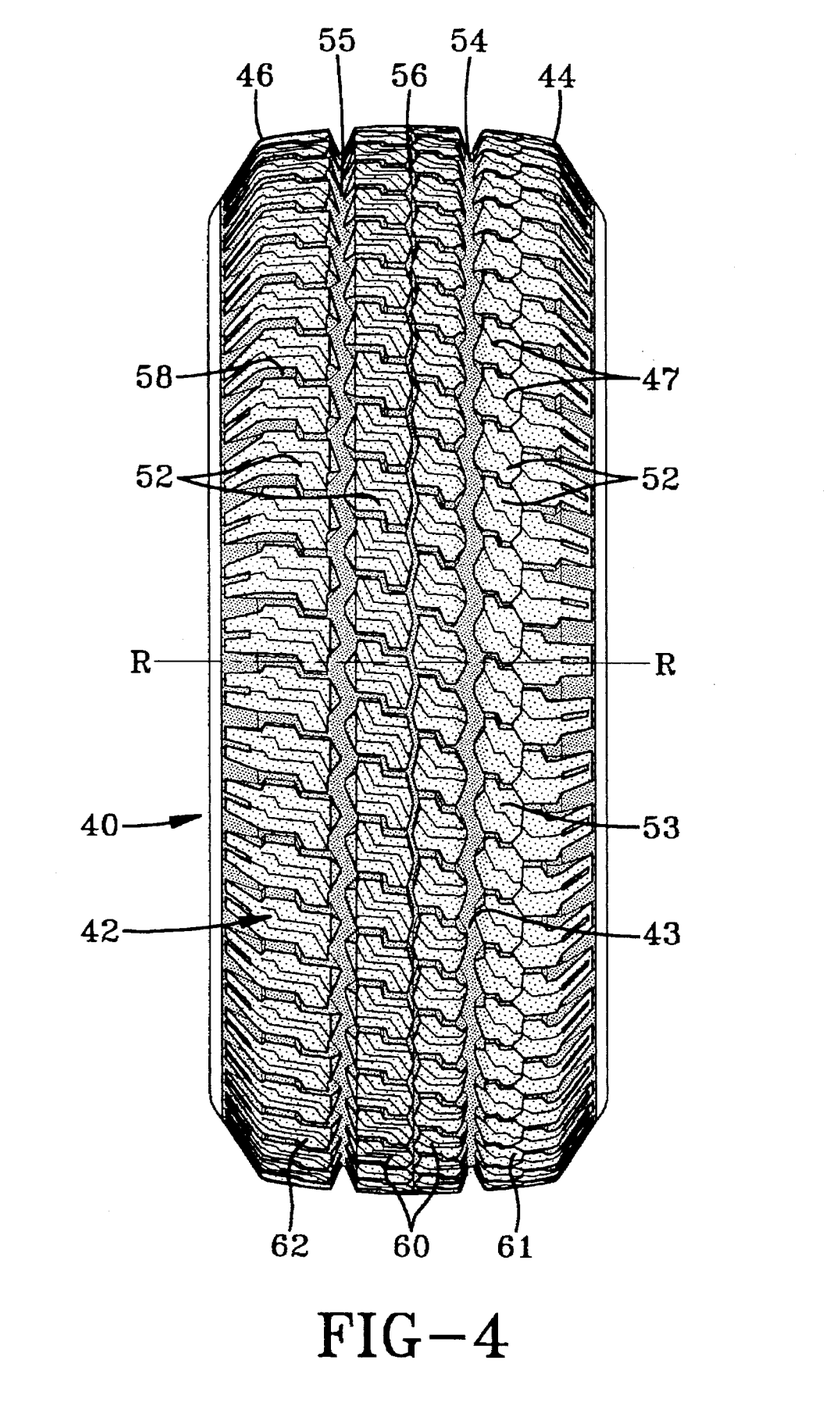
FIG. 4 is a plan view of a tread according to the present invention annularly attached to a tire.
Figure 6:
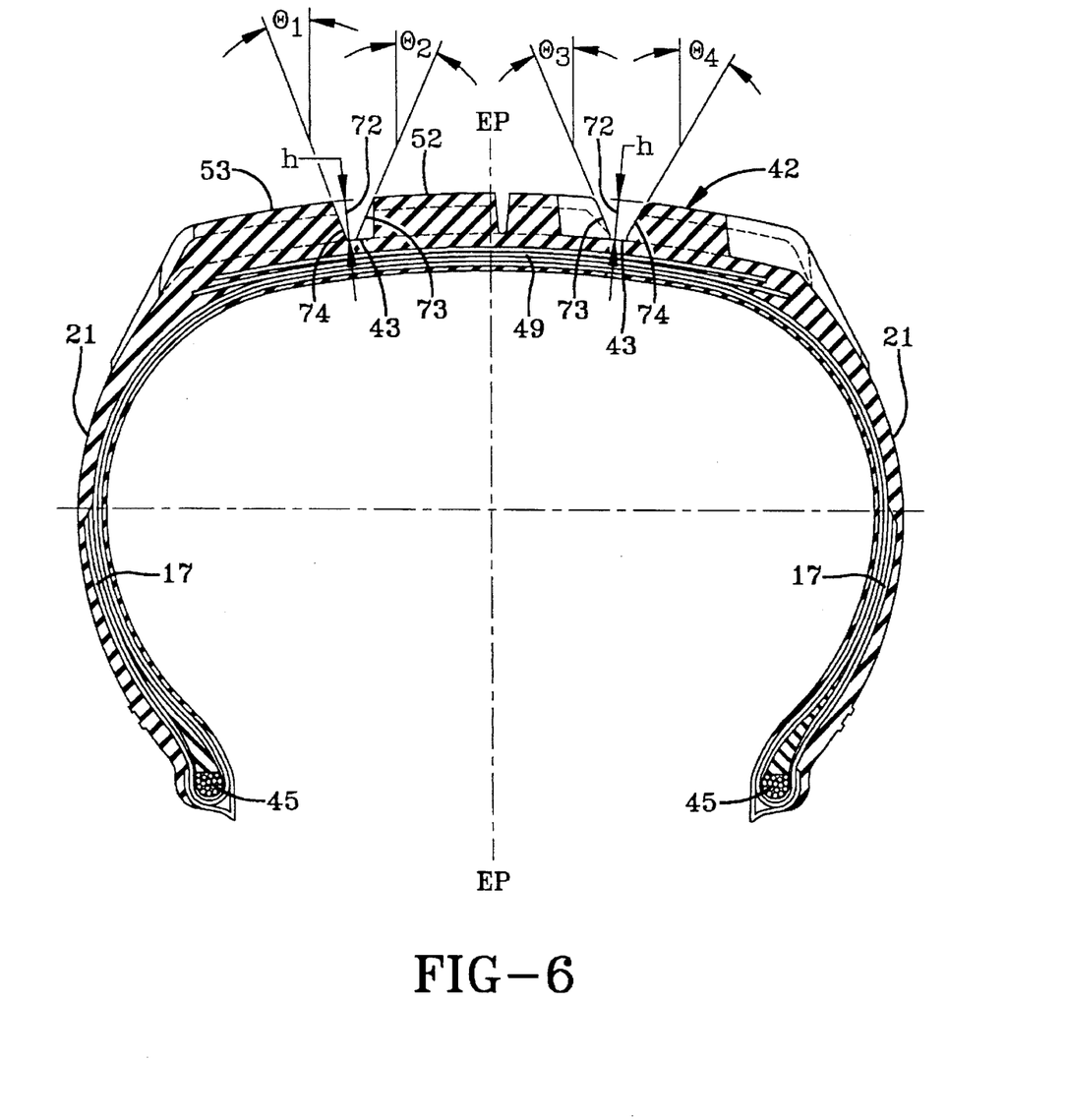
FIG. 6 is a cross-sectional view of the tire of FIG. 5 taken along a plane passing through the tire's axis of rotation.

The tread 42 has a plurality of ground engaging traction elements 52 separated by circumferential grooves 54,55,56 and lateral grooves 58. Each traction element includes one or more sipes 47, the sipe or sipes extending laterally completely across the element. The lateral grooves 58 may intersect and join to form a continuous lateral groove path across the entire tread width. Alternatively, the lateral grooves 58 may be laterally or circumferentially spaced and never connecting, or may meet at a groove. The traction elements 52 as shown are block elements; however, the traction elements 52 could be ribs or a combination of circumferentially continuous ribs and block elements. The tread 42 as illustrated in FIGS. 4–6 has an overall net contact area of about 62% measured from tread lateral edge to tread lateral edge. It is believed that the tire can be successfully produced with treads having overall net contact areas between 50% and 80%.

The tread 42 is divided laterally into three tread zones, 60,61,62. The first zone 60 is positioned between the two wide circumferential grooves 54,55. The second zone 61 is located between the first lateral edge 44 and the first wide groove 54. The third tread zone 62 is located between the second lateral 46 edge and the second wide groove 55. The outer or second tread zone 61 is intended to be mounted on the outer or outboard side of the vehicle (not shown) and the third tread zone 62 is intended to be on the inboard side. The second tread zone 61 preferably has a net contact area higher than the third tread zone 62 while the first tread zone 60 preferably has a net contact area between the value of the second zone 61 and 90% of the value of the third tread zone 62. Each zone is defined as the area between specified boundary edges. The first zone 60 has boundary edges defined by two planes, one plane passing through the intersections of the long bases 75 and the axially adjacent sides 73 of each groove 54 and 55. The second zone has boundary edges defined by the lateral edge 44 and a plane passing through the intersections of the long base 75 and the sides 74 of the window 72 of groove 54 closest in proximity to the lateral edge 44. The third zone 62 has boundary edges defined by the second lateral edge 46 and a plane passing through the intersections of the long base 75 and the side 74 of the window 72 of the groove 55.

With particular reference to FIG. 5, it can be seen that the first or central tread zone 60 has an axial width A, the second tread zone 61 an axial width B, and the third zone 62 an axial width C. In the preferred embodiment, the axial width A is greater than B or C, and axial width B is greater than C. Also, groove 54 has a long base 75 having an axial width E while groove 55 has a long base 75 having an axial width D, E being greater than D. These subtle features provide very specific and significant improvements. The central zone 60 when used on the lightly loaded rear wheel position of a light truck bears most of the load. Zone 60 has the greatest axial width which correspondingly means that the zone 60 may have a lower net-to-gross ratio than if each tread zone had been equal in axial width. The central zone 60 has a net-to-gross ratio of about 72% and an axial width of about 33% of TW. The second tread zone 61 has a net-to-gross ratio of about 83% and an axial width of about 23% of TW. The third tread zone 62 has a net-to-gross ratio of 73% and an axial width of 21% of TW. Groove 54 has an axial width of about 13% of TW and groove 55 has an axial width of 10% of the tread width TW. This change in axial widths from tread zone to tread zone enables the pattern to remain generally open over 77% of the tread width TW. The wide groove 54 adjacent the second tread zone 61 is about 30% wider than the opposite wide groove 55 adjacent the third zone 62. This feature permits the second zone 61 to exhibit a much higher net-to-gross ratio for improved wear and noise while increasing the volume of water that can be accommodated by the wide groove 54. The other groove 55 can be narrower due to the more open and wider lateral grooves which effectively balance the water handling capability of the tire 40.

With reference to FIG. 6, the tread 42 has a radial height h as measured from the base 43 to the radially outer road contacting surface 53. The zigzag portion 70 of the grooves 64,55 have a radial height ranging from 0% to 100% of h. Alternatively, the zig-zag portion 70 may have a radial height ranging from 25% to 100% of h. Groove 54 illustrates a zig-zag groove portion 70 that has a radial height starting at about 25% of h. Furthermore, the tread having a maximum radial height h, as measured from the tread base 43 to the road contacting surface 53, may have a zig-zag portion 70 having a maximum radial height in the range of 75% to 100% h, the height being dependent on the amplitude of the zig-zag and the width of the long base 75. Assuming the amplitude of the zig-zag is less than the width of the long base 75, then the maximum radial height of the zig-zag will be less than 100% h.

For the purposes of this invention, the measurements taken from the tread base 43 disregard tread wear indicators or stone penetration protection protrusions that may extend from the tread base 43. Additionally, the triangular or trapezoidal shaped window extends similarly to the tread base 43, the sides 73,74 of the window 72 define the maximum axial extent the zig-zag can protrude into the groove 54,55. If the zig-zag portion 70 has a minimum radial height greater than 0% of h then the zig-zag portion will intersect the triangular or trapezoidal side 73,74 at the point of its minimum radial height. Groove 54 displays such a condition as described above.

As can be seen from the figures and description, the prior art tread of the Wrangler GSA® and the preferred embodiment tread 42 of the present invention have many common features. The tire 40 of the present invention as shown in FIGS. 4–6 has employed the use of a unique wide groove design.

The wide groove 54,55 is uniquely designed to improve the hydroplaning resistance and wet traction capability of a light truck tire tread such as that shown in FIGS. 1–3, while at the same time maintaining the off-road and snow traction capability of the tire.

The wide groove 54,55 has a first portion 70 extending radially from the tread base in a circumferentially continuous zig-zag path. The wide groove has a window portion 72 extending radially inwardly from the outer surface 53 of axially adjacent traction elements 52 to the tread base 43. The window portion 72 radially superimposes the first zig-zag portion 70 of the groove 54,55. As shown in FIG. 8, the window portion 72 follows a circumferentially continuous straight path. The window portion 72 has a cross-sectional shape approximately or substantially triangular or trapezoidal. The triangular or trapezoidal shape has two sides 73,74, a radially outer long base 75, and a radially inner short base 76 or point of intersection 76. The sides 73,74 of the trapezoid defines the maximum axial extent of the zig-zag portion 70 into the groove 54,55.

As illustrated in FIG. 5, the zig-zag portion 70 has an amplitude about equal to the axial width (E or D) of the long base 75. It is believed that the amplitude can vary from 50% to 150% of the axial width of the long base 75. The long base 75 has an axial width in the range of 7% to 20% of the tread width TW, preferably about 7% to 10%.

As illustrated in FIGS. 4–6 of the preferred embodiment, two such wide grooves 54,55 are shown. Groove 55 bounding the third tread zone 62 has a window portion 72 wherein the sides 73,74 of the trapezoid are linearly inclined radially and axially outwardly from the groove center, the sides 73 and 74 of groove 55 being inclined at an angle $\theta_1$ for side 74 and $\theta_2$ for side 73 greater than 20° relative to the radial direction preferably 32°. As shown, the inclination of the sides 73,74 of groove 54 can be different relative to the radial direction. The side 74 in closest proximity to the lateral edge 46 having an inclination $\theta_4$ greater than the inclination $\theta_3$ of the side 73 closest to the equatorial plane, side 73 being 5° and 74 being greater than 20°, preferably about 34°.

Alternatively, the wide groove 54 as illustrated has the two sides 73,74 of the trapezoidal shaped window portion similarly inclined. The sides 73,74, instead of extending entirely linearly, have a radially outer convex curvature at the radially outermost extreme.

Although the preferred embodiment disclosed the use of two wide grooves 54,55 as described above, for light truck vehicles one such groove 54,55 may be employed in a tread pattern. It is believed feasible to employ such a groove 54,55 at the equatorial plane. Alternatively, the wide groove could be asymmetrically employed on just one side of a tread between the lateral edge and the equatorial plane. The use of at least one such wide groove is believed to improve the wet handling characteristic without sacrificing snow or off-road traction performance as compared to conventional tread patterns.

Figure 7:
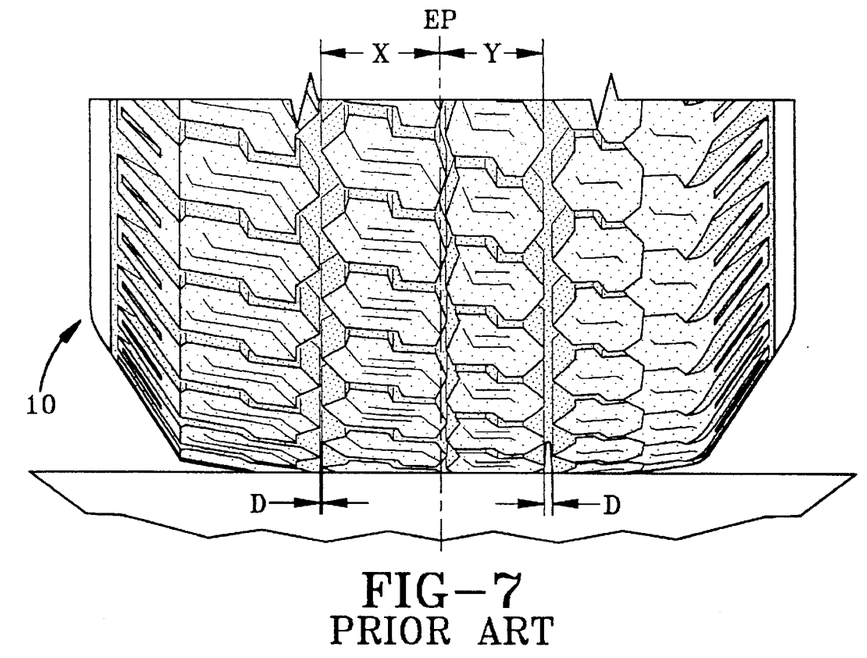
FIG. 7 is a partial plan view of the prior art tread as it normally contacts the road surface.

The aggressive zig-zag portion 70 of the groove 54,55 provides superb snow or mud traction providing many traction surfaces for forward momentum. By superimposing the window portion 72 over the zig-zag portion 70, a circumferentially continuous unobstructed trapezoidal shaped water channel is formed. This straight window portion facilitates water flow through the channel and increases the amount of water volume occupied by the groove. As shown in FIG. 7, conventional prior art zig-zag type grooves 24,25 obstruct water flow and diminish the amount of water volume that can be occupied by the groove.

With reference to the present invention as shown in FIG. 8, the lateral grooves are located to facilitate water flow. By intersecting the groove 54,55 with lateral extending grooves 58, additional water channeling can be achieved. The intersection of the lateral grooves 58 are preferably located circumferentially at or near the amplitude peaks of the zig-zag first portion 70. This feature, when combined with the wide grooves 54,55, can channel the water simultaneously laterally as well as circumferentially. The use of the lateral groove reduces the water flow restriction created by the protruding portions of the zig-zag portion 70.

Conventional zig-zag grooves 24,25, as shown in the prior art tire of FIG. 7, have protruding portions that axially overlap or almost axially overlap from side to side. This creates a natural obstruction to water flow and therefore the tire 10 effectively can only absorb the water trapped in the voids of the grooves. This can limit the depth of water at a given speed that can be accommodated without experiencing a loss of road contact of the tread 12, a phenomena commonly called hydroplaning. Alternatively, the tire 10 can be limited at a given depth of water to a certain speed prior to experiencing the loss of road contact.

Experimental tests compared the prior art tire as shown in FIGS. 1–3 with a similarly constructed tire according to FIGS. 4–6 of the present invention. Each tire 10,40, as illustrated in FIGS. 3 and 6 respectively, had a carcass, a pair of annular beads 15,45, a pair of radial carcass plies 17,47 extending from bead 15,45 to bead 15,45, and wrapped about each bead 15,45, a belt reinforcement 19,49 radially above the plies 17,47, and a pair of sidewalls 21,41, one extending from each bead to the tread 12,42, the tread 12,42 being radially outward and adjacent the belt reinforcement 19,49 Each tire tested, both the prior art control tire 10 and the test tire 40, used the same materials and components except for the tread design configuration.

| TEST SUMMARY | | |
|---|---|---|
| | Control Tire | Tire According to the Present Invention |
| Treadwear | 100 | 110 |
| Wear Uniformity | 100 | 110 |
| Wet Traction | 100 | 109 |
| Hydroplaning | 100 | 112 |
| Dry Traction | 100 | 97 |
| Snow Traction | 100 | 96 |
| Mud Traction | 100 | 95 |
| Gravel Traction | 100 | 89 |
| Noise | 100 | 108 |
| Ride Harshness | 100 | 100 |
| Handling Dry | 100 | 100 |
| Weight | 29.0 lbs | 28.23 lbs |

The wet traction tests were conducted at speeds of 60 mph. The hydroplane studies were tested at 0.080 inches of water depth at speeds of 80 mph. The control Wrangler GSA® maintained 42.7% of its contact path while the test tire retained 48.0%. Typically, many tires can lose most, if not all, of their contact path under such test conditions.

The treadwear data and the noise data were also considered very promising due in part to the more open appearance and the less tread rubber used. As can be seen, the tread of the test tire weighed about three-quarters of a pound less than the control tire. Normally one would expect a decrease in treadwear and a possibly noisier tread. The present invention places the tread rubber in the regions of highest load. By having the outboard shoulder zone in the form of a closed rib, much of the generated tire noise is trapped and muffled under the vehicle.

The differences between the control tire and the test tire are more significant in view of the similarities of the tread patterns as previously discussed. The improved performance results are believed to be directly attributable to unique tread pattern, the employment of the wide grooves 54,55, and the combination of these grooves and the lateral groove's placement.

The control tire as described is known for exceptional traction and wear performance. The Wrangler GSA® is commonly used in off-road racing; therefore, the slight drop in snow and mud traction was perceived as very encouraging. The improvements achieved are, therefore, believed to be quite outstanding in view of the control tire's already excellent attributes.

The above test results were based on molded control and test tires utilizing the same carcass. Additional on-going treadwear and ancillary testing of molded tires was still in progress at the time of this writing.

What is claimed:

1. A tread for a pneumatic light truck or automobile tire, the tread when incorporated in the tire having an axis of rotation, a pair of lateral edges, a tread width defined as the axial distance between lateral edges, and an equatorial plane perpendicular to the axis of rotation and spaced equidistant form the lateral edges, the tread comprising:

tread base;

a plurality of traction elements extending outwardly from the tread base to a radially outer road contacting surface;

a plurality of circumferentially continuous grooves including a first and a second circumferentially continuous wide grooves, the first and second wide groves each having circumferentially continuous windows extending from the tread base to the radially outer road contacting surface, wherein the tread when attached to a normally inflated and loaded tire and when viewed in plan or frontal view displays the windows, in the ground contacting portion of the tread, each window having a shape that is triangular or trapezoidal having two sides and a radially outer long base, each of the long bases having an axial width of 7% to 20% of the tread width, the first and second wide grooves dividing the plurality of traction elements into three distinct tread zones including a first zone, a second zone and a third zone, the first zone being located between the first and second wide grooves and axially defined as the axial distance between two planes, one each plane passing through the intersection of a long base and an axially adjacent side of a window of a respective wide groove, the second zone being located between the first lateral edge and a plane passing through the intersection of the long base and axially adjacent side of the window of the wide groove and the third zone being located between the second lateral edge and a plane passing through the intersection of the long base and the axially adjacent side of the window of the second wide groove, the first zone having a net-to-gross ratio measured around the entire circumference of the tread greater than 90% of the net-to-gross ratio of the third zone and less than the net-to-gross ratio of the second zone;

a plurality of lateral grooves, the plurality of lateral groves in combination with the circumferential grooves define the traction elements, one lateral groove intersecting one circumferentially continuous wide groove at each amplitude peak of the zig-zag portion on each side of the one wide groove, the amplitude peaks being the axially outermost locations of the zig-zag path as measured on either side of the one wide groove; and wherein each traction element adjacent the one wide groove has a straight edge and a portion of the traction element protruding into the one wide groove from the straight edge, the straight edges on one side of the one wide groove being aligned along a first line which extends in the circumferential direction, and the straight edges on the other side of the one wide groove being aligned a second line which extends in a circumferential direction, the axial distance between the first line and the second line defining the long base of the window.

2. The tread of a pneumatic light truck or automobile tire as in claim 1 wherein the second zone has a net-to-gross ratio than 110% of the third zone.

3. The tread of a pneumatic light truck or automobile tire as in claim 2 wherein the lateral grooves extends from one lateral edge to traction elements adjacent the other lateral edge.

4. The tread for a pneumatic light truck or automobile tire as in claim 2 wherein the zig-zag portion has an axial amplitude in the range of 75% to 150% of the width of the long base.

5. The tread for a pneumatic light truck or automobile tire as in claim 2 wherein the axial amplitude of the zig-zag portion is in the range of 100% to 125% of the width of the long base.

6. The tread for a pneumatic light truck or automobile tire as in claim 2 wherein the tread has radial height h as measured from the tread base of the radially outer mad contacting surface and the zig-zag portion has a minimal radial height of 0% h and a maximum radial height of 100% h.

7. The tread for a pneumatic light truck or automobile tire as in claim 2 wherein the zig-zag portion has a minimum radial height of 25% h and a maximum radial height of 100% h.

8. The tread for a pneumatic light truck or automobile tire as in claim 2 wherein the tread has a maximum radial height h as measured from the tread base to the road contacting surface and the zig-zag portion has a maximum radial height of 75% to 100% h.

9. The tread for a pneumatic light track or automobile tire as in claim 8 wherein the tread has a non-directional pattern.

10. The tread for a pneumatic light truck or automobile tire as in claim 2 wherein one side of the window of the groove is inclined at an angle relative to the radial direction greater than the opposite side.

11. The tread for a pneumatic light truck or automobile tire as in claim 2 wherein at least one of the wide grooves has a radially outer portion which, when viewed in cross section, is convexly tapered.

12. The tread for a pneumatic light truck or automobile tire as in claim 2 wherein the first zone has an axial width greater than the axial width of either the second or the third zone.

13. The tread for a pneumatic light truck or automobile tire as in claim 12 wherein the first groove has the long base having an axial width greater than the axial width of the long base of the second groove.

14. The tread for a pneumatic light truck or automobile tire as in claim 1 wherein each of the wide grooves is located between a lateral edge and the equatorial plane.

15. A tread for a pneumatic fight truck or automobile tire, the tread when incorporated in the tire having an axis of rotation, a pair of lateral edges, a tread width defined as the axial distance between lateral edges, and an equatorial plane perpendicular to the axis of rotation and spaced equidistant from the lateral edges, the tread comprising:

a tread base;

a plurality of traction elements extending radially outwardly from the tread base to a radially outer road contacting surface;

first and second circumferentially continuous wide grooves, the first and second wide grooves each having a zig-zag portion extending radially from the tread base in a circumferentially continuous zig-zag path, the zig-zag portion having an amplitude, the amplitude being limited in the axial direction to create a circumferentially continuous window of substantially triangular or trapezoidal shape extending from the tread base to the radially outer road contacting surface, the tread when incorporated in a normally inflated and loaded tire and when viewed in a plan or frontal view, displaying the triangular or trapezoidal shaped window having two sides and a radially outer long base, the long base having an axial width of 7% to 20% of the tread width, and wherein the first wide groove is axially spaced from the equatorial plane an axial distance less than the second wide groove as measured from the intersection of the long base and the nearest side of each window relative to the equatorial plane, the first and second wide grooves divide the plurality of traction elements into three distinct tread zones, a first zone located between the first and second wide grooves, a second zone located between a first lateral edge and the first wide groove and a third zone located between a second lateral edge and the second wide groove, the first zone has a net-to-gross ratio as measured around the entire circumference of the greater than 90% of the net-to-gross ratio of the third zone and less than the net-to-gross ratio of the second zone;

a plurality of lateral grooves, the plurality of lateral grooves in combination with the circumferential grooves define the traction elements, one lateral grooves intersecting one circumferential continuous wide groove at each amplitude peak of the zig-zag portion on each side of the wide groove, the amplitude peaks being the axially outermost locations of the zig-zag path as measured on either side of one wide groove; and wherein each traction element adjacent the one wide groove has a straight edge and a portion of the traction element protruding into the one wide groove from the straight edge, the straight edges on one side of the one wide groove being aligned along a first line which extends in the circumferential direction, and the straight edges on the other side of the one wide groove being aligned along a second line which extends in a circumferential direction, the axial distance between the first line and the second line defining the long base of the window.

16. The tread for a pneumatic light truck or automobile tire as in claim 15 wherein the zig-zag portion has an axial amplitude in the range of 75% to 150% of the width of the long base.

17. The tread for a pneumatic light truck or automobile tire as claimed in claim 16 wherein the axial amplitude of the zig-zag portion is in the range of 100% to 125% of the width of the long base.

18. The tread for a pneumatic light truck or automobile tire of claim 15 wherein the tread has a radial height h as measured from the tread base of the radially outer road contacting surface and the zig-zag portion has a minimum radial height of 0% h and a maximum radial height of 100% h.

19. The tread for a pneumatic light truck or automobile tire as in claim 15 wherein the zig-zag portion has a minimum radial height of 25% h and a maximum radial height of 100% h.

20. The tread for a pneumatic light truck or automobile tire as in claim 16 wherein the tread has a maximum radial height h as measured from the tread base to the road contacting surface and the zig-zag portion has a maximum radial height of 75% to 100% h.

21. The tread for a pneumatic light truck or automobile tire as in claim 16 wherein the tread has a pattern that is asymmetrical.

22. The tread for a pneumatic light truck or automobile tire as in claim 21 wherein the tread pattern is non-directional.

23. The tread for a pneumatic light truck or automobile tire as in claim 15 wherein one side of the window of the groove is inclined at an angle relative to the radial direction greater than the opposite side.

24. The tread for a pneumatic light truck or automobile tire as in claim 15 wherein at least one of the first or second wide grooves have a radially outer portion which when viewed in cross section, is convexly taped.

25. The tread for a pneumatic light truck or automobile tire as in claim 13 wherein the second tread zone has a net-to-gross ratio greater than 110% of the net-to-gross ratio of the third zone.

* * * * *